United States Patent
Chen et al.

(10) Patent No.: US 11,579,399 B2
(45) Date of Patent: Feb. 14, 2023

(54) CAMERA MODULE AND ELECTRONIC DEVICE

(71) Applicant: TRIPLE WIN TECHNOLOGY(SHENZHEN) CO. LTD., Shenzhen (CN)

(72) Inventors: Shin-Wen Chen, New Taipei (TW); Jing-Wei Li, Guangdong (CN); Sheng-Jie Ding, Guangdong (CN); Jian-Chao Song, Guangdong (CN)

(73) Assignee: TRIPLE WIN TECHNOLOGY(SHENZHEN) CO.LTD., Shenzhen (CN)

( * ) Notice: Subject to any disclaimer, the term of this patent is extended or adjusted under 35 U.S.C. 154(b) by 343 days.

(21) Appl. No.: 17/030,579

(22) Filed: Sep. 24, 2020

(65) Prior Publication Data
US 2022/0066118 A1    Mar. 3, 2022

(30) Foreign Application Priority Data
Aug. 27, 2020 (CN) .......................... 202010881182.3

(51) Int. Cl.
G02B 7/02 (2021.01)
H04N 5/225 (2006.01)
G02B 5/00 (2006.01)

(52) U.S. Cl.
CPC .............. *G02B 7/02* (2013.01); *G02B 5/003* (2013.01); *H04N 5/2253* (2013.01)

(58) Field of Classification Search
CPC ........ G02B 7/02; G02B 5/003; G02B 13/001; H04N 5/2253; H04N 5/2254; H04N 5/2257; H04N 5/2251; G03B 17/55
See application file for complete search history.

(56) References Cited

U.S. PATENT DOCUMENTS

| 2012/0133825 A1* | 5/2012 | Nakajima | H04N 5/2254 348/374 |
| 2012/0148223 A1* | 6/2012 | Chiu | G03B 13/10 310/323.02 |
| 2017/0310861 A1* | 10/2017 | Wang | H04N 9/04 |

FOREIGN PATENT DOCUMENTS

| CN | 208112683 U | 11/2018 | |
| KR | 20110101671 A | * 9/2011 | G03B 17/02 |
| TW | 202019155 A | 5/2020 | |
| WO | WO-2020151481 A1 | * 7/2020 | H04N 5/225 |

OTHER PUBLICATIONS

Machine Translation of WO-2020151481-A1 (Year: 2020).*
Machine Translation of KR 20110101671 A (Year: 2011).*

* cited by examiner

Primary Examiner — Darryl J Collins
Assistant Examiner — Matthew Y Lee
(74) Attorney, Agent, or Firm — ScienBiziP, P.C.

(57) ABSTRACT

A tray feeding box includes a box body; a cover, arranged at a first end of the box body; and a bottom board, arranged at a second end of the box body away from the cover. The cover includes at least one first cover arranged at the first end of the box body. The at least one first cover is defined with a first opening. The box body is defined with a take-out gap communicated with the first opening.

20 Claims, 7 Drawing Sheets

CAMERA MODULE AND ELECTRONIC DEVICE

FIELD

The subject matter herein generally relates to camera technology, especially to a camera module and an electronic device.

BACKGROUND

A camera module, also known as a computer camera, a computer eye, or an electronic eye, is an image or a video input device, which is widely used in remote video and real-time monitoring applications.

Generally, a traditional camera module between a bracket and circuit board, as well as the bracket and the lens holder in the traditional camera module are fixed by adhesive layers. However, light may pass through the adhesive layers, which leads to entrance of external light from sides of the camera module where the adhesive layer is arranged to an internal photosensitive chip. Stray light may affect the images.

BRIEF DESCRIPTION OF THE DRAWINGS

Implementations of the present disclosure will now be described, by way of embodiment, with reference to the attached figures.

FIG. 3 is a cross sectional view of the camera module taken along line in

FIG. 2.

DETAILED DESCRIPTION

Figure 1:
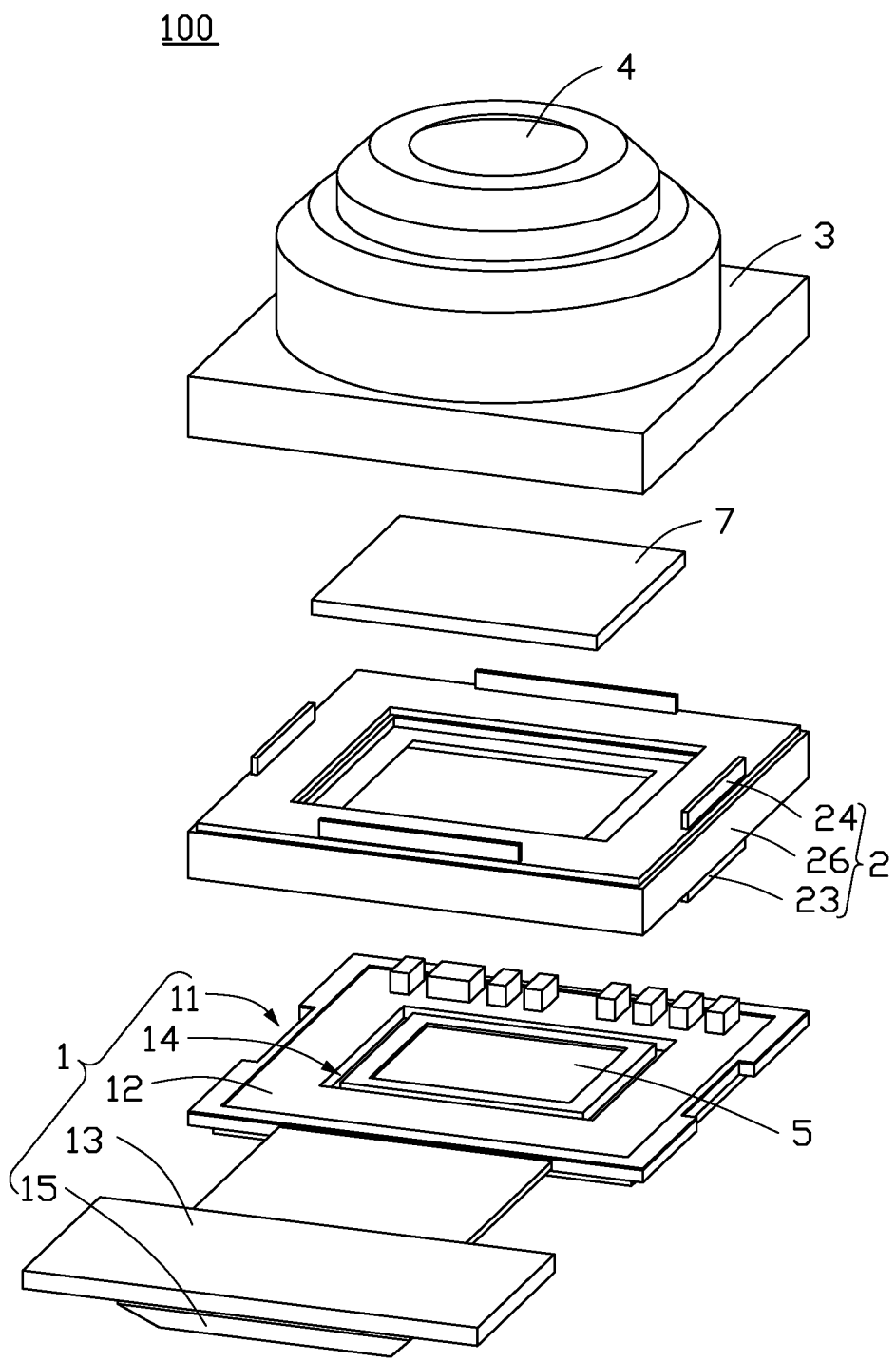
FIG. 1 is an exploded view of a camera module according to an embodiment of the present disclosure.

The embodiments of the present disclosure will be described clearly and completely below in combination with the accompanying drawings. Obviously, the described embodiment is only part of the embodiments of the present disclosure, not all of the embodiments. Based on the embodiments in the present disclosure, all other embodiments obtained by those skilled in the art without creative labor belong to the protection scope of the present application.

It should be noted that if a component is called "fixed" to another component, it can be directly or indirectly fixed to another component or indirectly fixed to another component by an intermediate component. If a component is considered to "connect" to another component, it can be directly connected to another component or indirectly connected to another component by an intermediate component. When a component is considered to be "arranged" on another component, it can be set directly to another component or indirectly arranged on another component by an intermediate component. The terms "vertical", "horizontal", "left", "right" and similar expressions indicating directions or positions are based on the directions or positions shown in the attached drawings in order to facilitate the description of the embodiment and simplify the description of the invention, rather than indicating or implying that the device or element referred to must have a specific orientation, be constructed and operated in a specific orientation, it cannot be understood as a limitation of the embodiment of the invention.

Unless otherwise defined, all technical and scientific terms used in the present disclosure have the same meanings as those generally understood by those skilled in the technical field of the application. The terms used in the specification of the present application are only for the purpose of description, and are not intended to limit the present application. The term "or/and" used in the present disclosure includes any one of and all combinations of two or more related listed items.

Some embodiments of the present disclosure are described in detail below in combination with the attached drawings. Without conflict, the following embodiments and features in the embodiments may be combined with each other.

Referring to FIGS. 1-8, a camera module 100 of the present disclosure is provided. The camera module 100 includes a circuit board 1, a bracket 2 arranged at the circuit board 1, a lens holder 3 arranged at the bracket, a lens module 4 arranged inside the lens holder 3, and a chip 5 arranged on the circuit board 1. The chip 5 is arranged inside the bracket 2, the lens module 4 is arranged on the chip 5, and the lens module 4 and the chip 5 are coaxially arranged.

The bracket 2 includes a frame 26 and a shield structure 27. The frame 26 includes a first surface 21 facing the circuit board 1 and a second surface 22 away from the first surface 21. The shield structure 27 includes a plurality of first blocking elements 23 arranged on the first surface 21 and a plurality of second blocking elements 24 arranged on the second surface 22. The circuit board 1 is defined with a plurality of first slots 11 corresponding to the plurality of first blocking elements 23. The first blocking elements 23 can be inserted in the first slots 11 to fix the bracket 2 and the circuit board 1. The lens holder 3 is defined with a plurality of second slots 31 corresponding to the plurality of second blocking elements 24. The second blocking elements 24 can be inserted in the second slots 31 respectively to fix the lens holder 3 and the bracket 2. The first blocking elements 23 and the second blocking elements 24 can prevent external light from entering the camera module through a gap between the bracket 2 and the circuit board 1 and a gap between the bracket 2 and the lens holder 3.

In the illustrated embodiment, the circuit board 1 further includes a base 12 and an extending part 13 extending away from a side of the base 12. The extending part 13 is connected with a connector 15. The first slots 11 are arranged on the base 12 adjacent to the bracket 2.

In the illustrated embodiment, there are dense circuit lines on the extension part 13, the first card slot 11 is not defined on a side of the circuit board body 12 corresponding to the extension part 13 in order to avoid damaging the circuit lines.

In the illustrated embodiment, the base 12 is substantially rectangular, the number of the first slots 11 is three. Three first slots 11 are respectively arranged three sides of the base 12 where the extending part 13 is not arranged.

In the illustrated embodiment, each of the first slots 11 are in a shape of L. The L shape facilitates inserting of the first blocking element 23.

Figure 8:
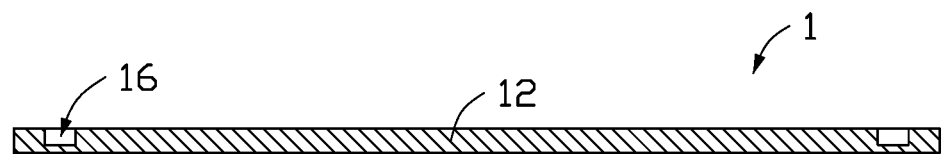
FIG. 8 is a schematic diagram of a circuit board according to another embodiment of the present disclosure.

Referring to FIG. 8, in another embodiment, the first slot 16 in the camera module 200 can be in a U-shape. The U-shape can make the first blocking element 23 and the first slot 16 more firmly connected, and the effect of preventing external stray light from entering the module is better.

In the illustrated embodiment, the base 12 is defined with a groove 14, the chip 5 is received in the groove 14. Specifically, the chip 5 is attached inside the groove 14 by an adhesive layer.

In the illustrated embodiment, the bracket 2 further includes a connecting element 25. The connecting element 25 is connected between the first blocking elements 23 and the second blocking elements 24. The frame 26 is arranged at an outer side of the connecting element 25. The first blocking elements 23 and the second blocking elements 24 extend to an outside of the frame 26.

In the illustrated embodiment, the first blocking elements 23, the second blocking elements 24 and the connecting element 25 are integrally formed. Specifically, the connecting element 25, the first blocking elements 23 and the second blocking elements 24 can made of metal, such as cupper sheets. Metal material can unwanted electromagnetic interference and improve heat dissipation capacity of the camera module 100.

In at least one embodiment, each first blocking element 23 and an adjacent one of the second blocking elements 24 are symmetrically arranged at two opposite sides of the connecting element 25.

In the illustrated embodiment, each connecting element 25 is substantially rectangular. The number of the first blocking elements 23 is three, the number of the second blocking elements 24 is four. At three sides of the connecting element 25, one of the first blocking elements 23 and a corresponding one of the second blocking elements 24 are symmetrically arranged at two opposite sides of the connecting element, and at the other one side of the connecting element 25, there is only one of the second blocking elements 24 is arranged. Absence of the first blocking element 23 in the other one side of the connecting element 25 facilitates extending of the extending part 13.

A height of the first blocking element 23 and the second blocking element 24 can be designed according to a thickness of the circuit board 1 and the lens holder 3. The height of the first blocking element 23 is less than the thickness of the circuit board 1, and the height of the second blocking element 24 is less than the thickness of the lens holder 3.

A length of each first blocking element 23 and each second blocking element 24 can be designed according to a size of the connecting element 25. The first blocking elements 23 and the second blocking elements 24 are configured to prevent the external light from entering the camera module 100 and affecting the chip 5. Therefore, the length of each first blocking element 23 and each second blocking element 24 should be designed to be greater than a length of a corresponding edge of the chip 5. It can be understood that a maximum length of the second blocking 24 is equal to a perimeter of the connecting element 25. That is, the second blocking element 24 is arranged on the connecting element 25 along the perimeter of the connecting element 25. In addition, the first blocking element 23 can be designed on the connecting element 25 along the perimeter of the connecting element 25 except a portion from which the extension part 13 extend out.

In at least one embodiment, the frame 26 can be made of plastics. The frame 26 can be formed on the connecting element 25 by injection molding with the first blocking elements 23 and the second blocking elements 24 extending out from the frame 26.

In the illustrated embodiment, the frame 26 includes a hollow first mounting part 261 and a second mounting part 262 extending from an inner side of the first mounting part 261. The first mounting part 261 encloses the connecting element 25. A filter 7 is arranged at the second mounting part 262. Specifically, the filter 7 is attached on the second mounting part 262 by an adhesive layer. The chip 5, the lens module 4, and the filter 7 are coaxially arranged.

In the illustrated embodiment, a first adhesive layer 6 is arranged between the bracket 2 and a circuit board 1. The first adhesive layer 6 is arranged around the first blocking elements 23. Through the first adhesive layer 6, the bracket 2 and the circuit board 1 are fixed together.

In at least one embodiment, the first adhesive layer 6 can be a light shielding glue, which can further block the external light from entering the camera module 100.

In the illustrated embodiment, the lens holder 3 includes a first side wall 32 and a second side wall 33 connected with the first side wall 32. The first side wall 32 defines a first chamber 34, and the second side wall 33 defines a second chamber 35. The lens module 4 is arranged inside the first chamber 34, and the filter 7 is arranged inside the second chamber 35. The first side wall 32 is provided an inner thread on an inner surface thereof, and the lens module is provided with an outer thread on an outer surface thereof. The inner thread can be engaged with the outer thread to fix the lens module 4 and the first side wall 32.

In the illustrated embodiment, the second slots 31 can be arranged on the second side wall 33 away from the first side wall 32. Specifically, a depth of each second slot 31 is equal to that of the second blocking element 24. A depth of each second slot 31 is less than a height of the first side wall 32.

In the illustrated embodiment, the second slots 31 are U-shaped. The U-shaped slot can make the second blocking elements 24 and the second slots 31 more connected more firmly, thereby improving the effect of preventing external stray light from entering the camera module 100.

Figure 6:
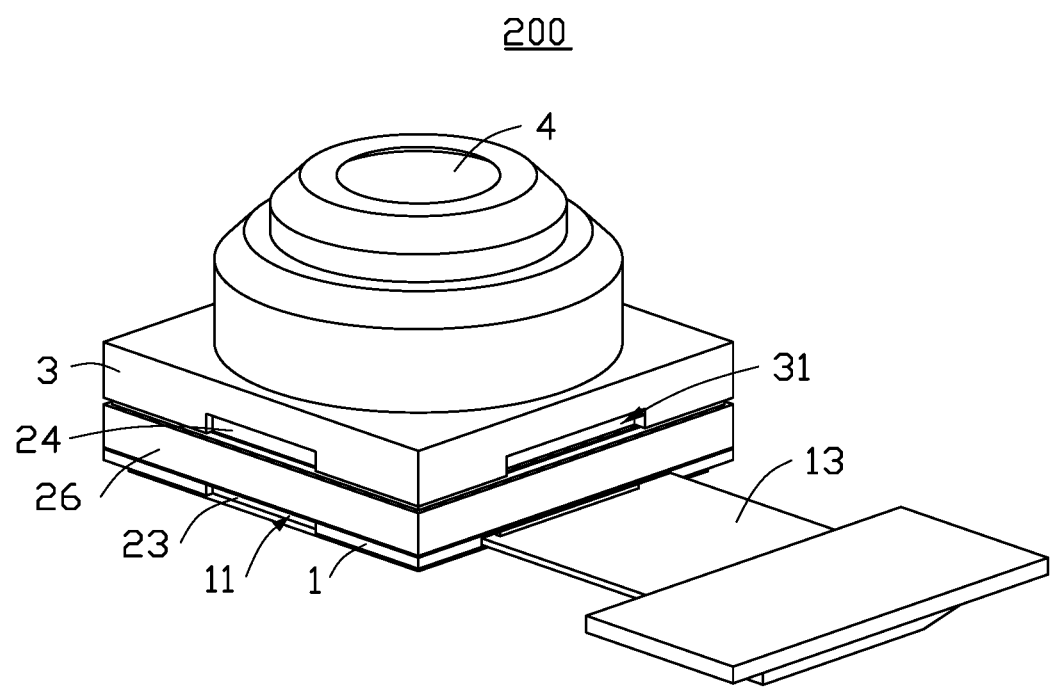
FIG. 6 is a schematic diagram of a camera module according to another embodiment of the present disclosure.

Referring to FIG. 6, in another embodiment, the second slots 36 can be L-shaped. The L-shaped slots facilitate connection between the second blocking elements 24 and the second slots 36.

In the illustrated embodiment, an end of the second side wall 33 away from the first side wall 32 is connected with the bracket 2 by a second adhesive layer 9. The second adhesive layer 9 is arranged around the second blocking elements 24.

In at least one embodiment, the second adhesive layer 9 can be a light shielding glue, which can further block the external light from entering the camera module 100.

In at least one embodiment, the lens holder 3 can be made of plastics which is integrally formed by injection molding.

Figure 2:
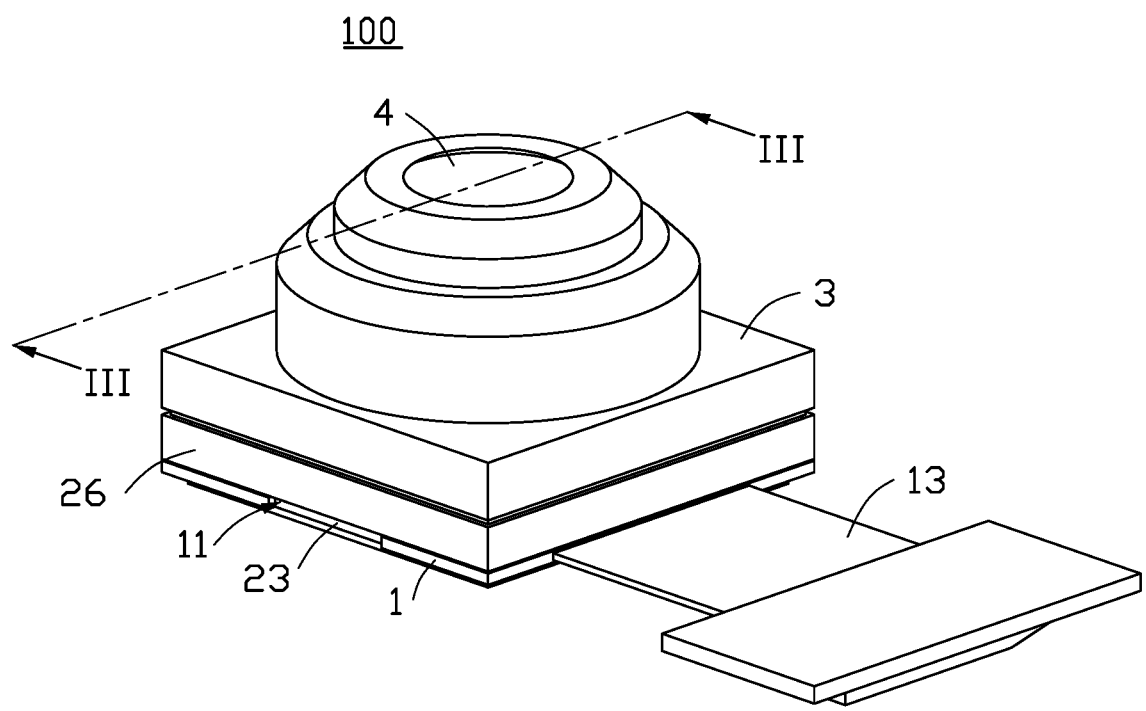
FIG. 2 is a schematic diagram of a camera module according to an embodiment of the present disclosure.
Figure 3:
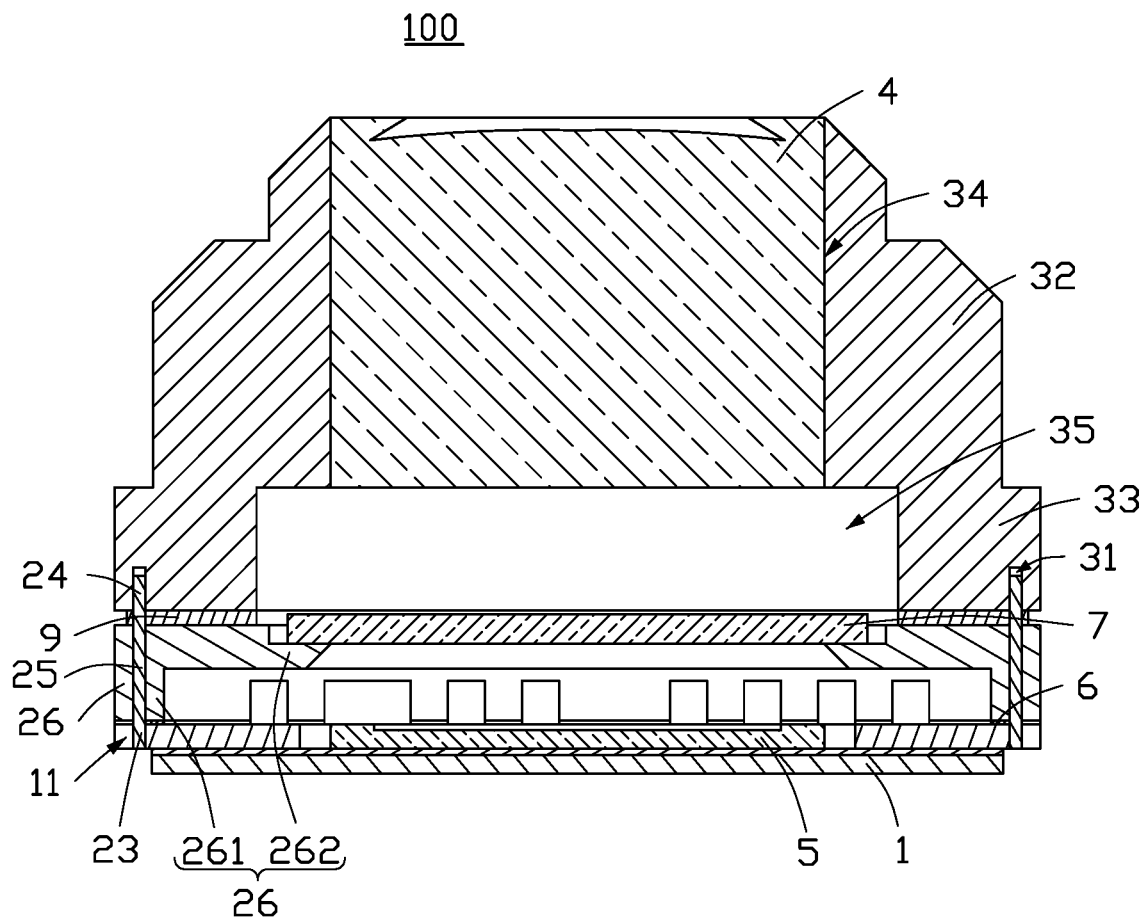
Figure 4:
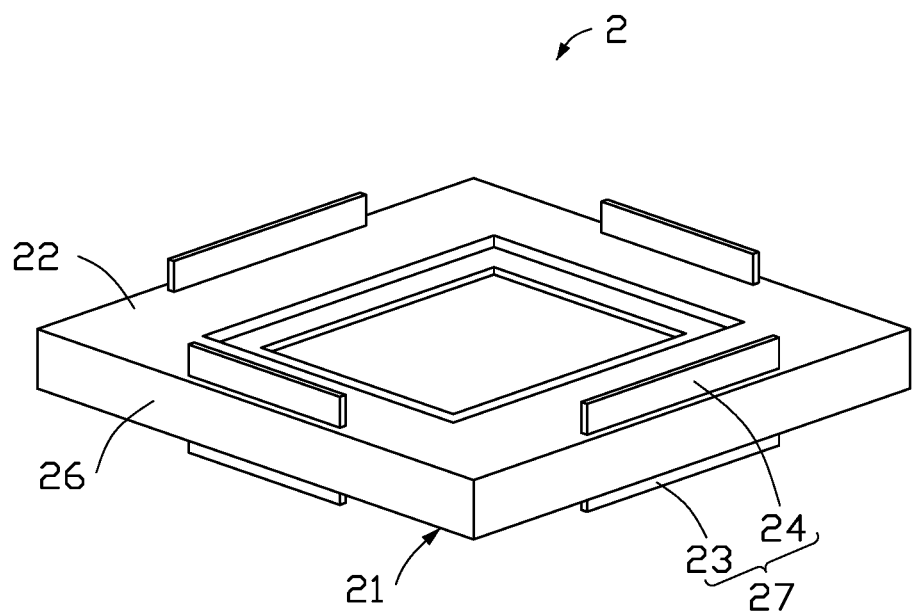
FIG. 4 is a schematic diagram of a bracket according to an embodiment of the present disclosure.
Figure 5:
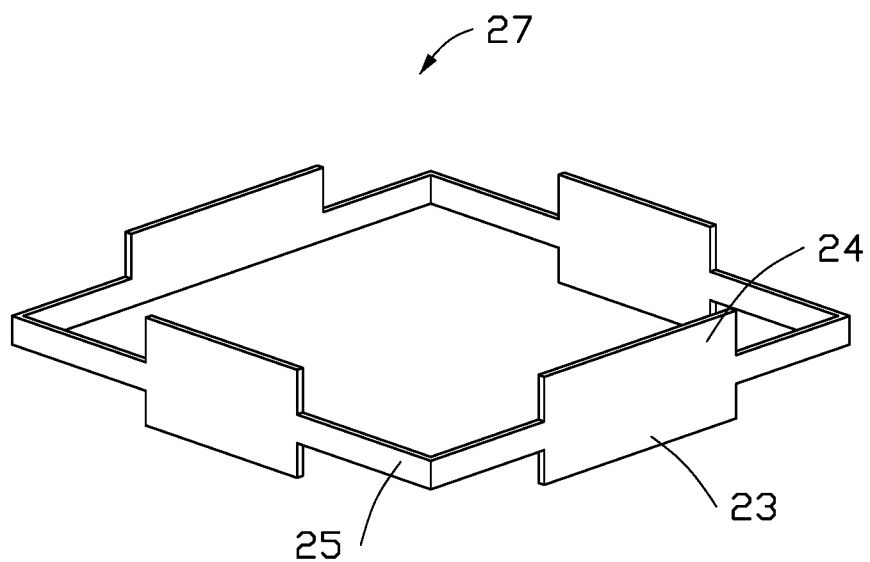
FIG. 5 is a schematic diagram of a frame according to an embodiment of the present disclosure.

Referring to FIGS. 1-3, the camera module 100 can be assembled as follow:

The chip 5 is arranged on the circuit board 1 by surface mounted technology (SMT).

The filter 7 is mounted on the bracket 2, and then the bracket 2 and the circuit board 1 are mounted together. Specifically, the first adhesive layer 6 is pasted on the upper surface of the circuit board 1 without blocking the first card slots 11. The bracket 2 is attached on the circuit board 1 with the extending part 13 extending from the side where the first blocking elements 23 is not arranged and the first blocking elements 23 being inserted into the first slots 11 to obtain a first semi-finished product.

The lens module 4 is mounted inside the first chamber 34 of the lens holder 3. The second adhesive layer 9 is pasted on the bracket 2 facing the lens holder 3 without covering the second blocking elements 24. The lens holder 3 is attached on the bracket 2 with the second blocking elements 24 being inserted in the second slots 31 and the chip 5, the filter 7 and the lens module 4 coaxially arranged to obtain the camera module 100.

Figure 7:
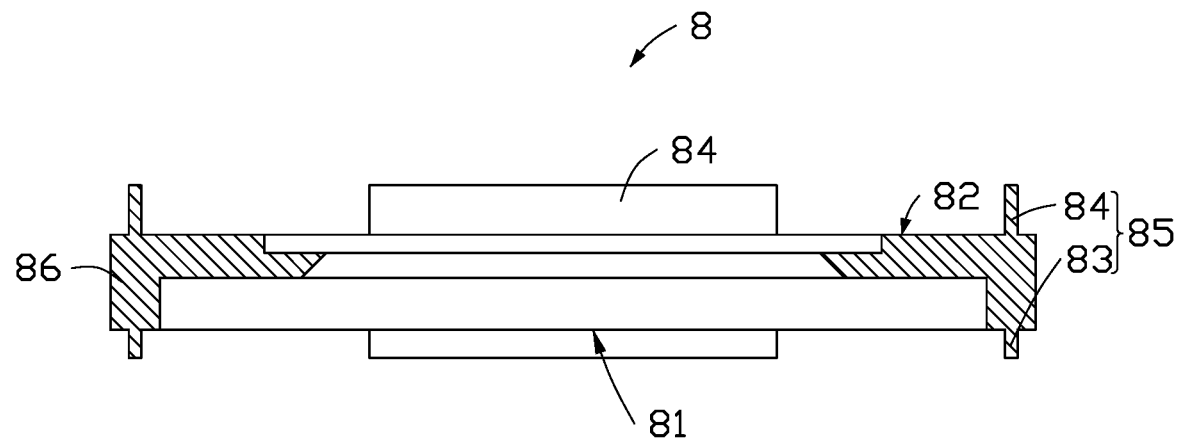
FIG. 7 is a schematic diagram of a bracket according to another embodiment of the present disclosure.

Referring to FIG. 7, in another embodiment, the bracket 8 includes a frame 86 and a shielding structure 85. The frame 86 includes a first surface 81 facing towards the circuit board 1 and a second surface 82 away from the first surface 82. The shielding structure 85 incudes first blocking elements 83 arranged on the first surface 81 and second blocking elements 84 arranged on the second surface 82. The bracket 8 is integrally formed.

In at least one embodiment, the bracket 8 is made of plastics. The frame 86 and the shielding structure 85 are integrally formed by injection molding which is simple in processes.

The present disclosure further provides an electronic device including the camera module 100 or 200.

Compared with conventional technologies, the camera module provided by the present disclosure can effectively prevent the external light from entering the camera module by the first blocking elements and the second blocking elements on the upper and lower surfaces of the bracket, thus improving the imaging quality. In addition, arrangement of the camera module provided by the present disclosure can increase structure strength of the camera module. Furthermore, in some embodiments, the first blocking elements, the second blocking elements and the frame can be made of metal materials, which can effectively avoid unwanted electromagnetic interference and improve the heat dissipation capacity of the camera module.

It can be understood that ordinary person skilled in the art can make various other corresponding changes and deformations according to the technical concept of the present disclosure, and all such changes and deformations shall belong to the protection scope of the present application.

What is claimed is:

1. A camera module, comprising:
 a circuit board;
 a bracket on the circuit board;
 a lens holder on the bracket;
 a chip on the circuit board and inside the bracket; and
 a lens module inside the lens holder;
 wherein the bracket comprises a frame and a shielding structure, the frame comprises a first surface facing towards the circuit board and a second surface away from the first surface, the shielding structure comprises at least one first blocking element on the first surface and at least one second blocking element on the second surface; the circuit board comprises at least one first slot corresponding to the at least one first blocking element, the at least one first blocking element is insertable into the at least one first slot, the lens holder comprises at least one second slot corresponding to the at least one second blocking element, the at least one second blocking element is insertable into the at least one second slot.

2. The camera module according to claim 1, wherein the shielding structure comprises a connecting element, the at least one first blocking element and the at least one second blocking element are respectively arranged at two opposite sides of the connecting element.

3. The camera module according to claim 2, wherein the frame surrounds the connecting element and the at least one first blocking element and the at least one second blocking element extends to an outside of the frame.

4. The camera module according to claim 2, wherein the at least one first blocking element, the at least one second blocking element, and the connecting element are an integrated structure.

5. The camera module according to claim 2, wherein the shielding structure is made of metal.

6. The camera module according to claim 2, further comprises a filter, wherein the frame comprises a hollow first mounting part and a second mounting part extending from an inner side of the first mounting part, the first mounting part surrounds the first connecting element, the filter is inside the second mounting part.

7. The camera module according to claim 1, wherein frame and the shielding structure are made of plastics.

8. The camera module according to claim 1, wherein the at least one first slot and the at least one second slot are L shaped or U shaped.

9. The camera module according to claim 1, wherein the bracket is connected with the circuit board by a first adhesive layer surrounding the at least one first blocking element.

10. The camera module according to claim 1, wherein the bracket is connected with the lens holder by a second adhesive layer surrounding the at least one second blocking element.

11. An electronic device, comprising a camera module, wherein the camera module comprises: a circuit board;
 a bracket on the circuit board;
 a lens holder on the bracket;
 a chip on the circuit board and inside the bracket; and
 a lens module, arranged inside the lens holder;
 wherein the bracket comprises a frame and a shielding structure, the frame includes a first surface facing towards the circuit board and a second surface away from the first surface, the shielding structure includes at least one first blocking element arranged on the first surface and at least one second blocking element arranged on the second surface; the circuit board is defined with at least one first slot corresponding to the at least one first blocking element, the at least one first blocking element being capable of inserting in the at least one first slot, the lens holder is defined with at least one second slot corresponding to the at least one second blocking element, the at least one second blocking element being capable of inserting in the at least one second slot.

12. The electronic device according to claim 11, wherein the shielding structure includes a connecting element, the at least one first blocking element and the at least one second blocking element are respectively arranged at two opposite sides of the connecting element.

13. The electronic device according to claim 12, wherein the frame is arranged around the connecting element and the at least one first blocking element and the at least one second blocking element extends to an outside of the frame.

14. The electronic device according to claim 12, wherein the at least one first blocking element, the at least one second blocking element, and the connecting element are integrally formed.

15. The electronic device according to claim 12, wherein the shielding structure is made of metal.

16. The electronic device according to claim 12, wherein the camera module further comprises a filter, the frame includes a hollow first mounting part and a second mounting part extending from an inner side of the first mounting part, the first mounting part is arranged around the first connecting element, the filter is arranged inside the second mounting part.

17. The electronic device according to claim 11, wherein frame and the shielding structure are made of plastics.

18. The electronic device according to claim 11, wherein the at least one slot and the at least one second slot are L shaped or U shaped.

19. The electronic device according to claim 11, wherein the bracket is connected with the circuit board by a first adhesive layer which is arranged around the at least one first blocking element.

20. The electronic device according to claim 11, wherein the bracket is connected with the lens holder by a second adhesive layer which is arranged around the at least one second blocking element.

* * * * *